US011303497B2

(12) United States Patent
Yang (10) Patent No.: US 11,303,497 B2
(45) Date of Patent: Apr. 12, 2022

(54) METHOD AND APPARATUS FOR GENERATING A QUADRATURE MODULATED SIGNAL NEAR ZERO FREQUENCY FOR TRANSMISSION

(71) Applicant: Samsung Electronics Co., Ltd., Gyeonggi-do (KR)

(72) Inventor: Sung Moon Michael Yang, Irvine, CA (US)

(73) Assignee: Samsung Electronics Co., Ltd

( * ) Notice: Subject to any disclaimer, the term of this patent is extended or adjusted under 35 U.S.C. 154(b) by 297 days.

(21) Appl. No.: 16/700,505

(22) Filed: Dec. 2, 2019

(65) Prior Publication Data

US 2020/0177433 A1 Jun. 4, 2020

Related U.S. Application Data

(60) Provisional application No. 62/774,284, filed on Dec. 2, 2018.

(51) Int. Cl.
*H04L 27/36* (2006.01)
*H04L 27/26* (2006.01)

(52) U.S. Cl.
CPC ........ *H04L 27/365* (2013.01); *H04L 27/2607* (2013.01); *H04L 27/2634* (2013.01)

(58) Field of Classification Search
CPC .............. H04L 27/365; H04L 27/2607; H04L 27/2634
See application file for complete search history.

(56) References Cited

FOREIGN PATENT DOCUMENTS

CN 101072079 A * 11/2007
JP 3541722 B2 * 7/2004

* cited by examiner

*Primary Examiner* — Elton Williams
(74) *Attorney, Agent, or Firm* — The Farrell Law Firm, P.C.

(57) ABSTRACT

Methods and apparatuses are provided for generating a quadrature modulated signal for transmission in an electronic device. Samples are obtained from a quadrature amplitude modulation (QAM) signal at a predefined sampling rate to generate a signal spectrum. The samples are interpolated to move the signal spectrum on a frequency axis. Modulation is performed on the interpolated samples based on a digital carrier frequency to move the signal spectrum on the frequency axis. Digital to analog conversion and analog filtering are performed on the modulated samples in a real part of the signal spectrum to generate a quadrature modulated signal for transmission.

20 Claims, 9 Drawing Sheets

METHOD AND APPARATUS FOR GENERATING A QUADRATURE MODULATED SIGNAL NEAR ZERO FREQUENCY FOR TRANSMISSION

PRIORITY

This application is based on and claims priority under 35 U.S.C. § 119(e) to a U.S. Provisional Patent Application filed on Dec. 2, 2018 in the United States Patent and Trademark Office and assigned Ser. No. 62/774,284 the contents of which are incorporated herein by reference.

FIELD

The present disclosure relates generally to signaling systems, and more particularly, to a method and an apparatus for generating a quadrature modulated signal for transmission.

BACKGROUND

Signaling systems of short wired connections, for example, serial and de-serial (SERDES), chip to chip interconnections, and backplane interconnections, are moving toward coded (i.e., error correction), modulated (i.e., quadrature modulated) signals. This is due to the demand for higher transmission speeds that are in the range of a few to tens of Giga bits, along with a desire for as little power consumption as possible. Coded, modulated signaling had been exclusively used in radio frequency and coaxial cable communication systems. Currently, coded, modulated signaling is being used universally, including in optical transmissions with wave division multiplexing.

The signaling systems of short wired connections, such as, for example, SERDES, have a long tradition of using binary transmission along with run length limited code for ease of clock recovery and error correction. Due to technology advancements in integrated circuits in terms of speed and bit resolution, these signaling systems are moving toward multilevel modulations, such as, for example, a 4-level pulse amplitude modulation (PAM), which can carry 2 bits per symbol, doubling the transmission capacity compared to binary symbol transmission.

Quadrature modulations use both carriers of cosine and sine, which are in-phase and quadrature phase, in other words, they are 90° apart. This is commonly referred to as quadrature amplitude modulation (QAM), but it requires a carrier frequency with in-phase and quadrature phase. Thus, a symbol is complex containing both a real part and an imaginary part. In a typical radio frequency (RF) transmission, the carrier frequency is much larger than the bandwidth of a signal.

SUMMARY

According to one embodiment, a method is provided for generating a quadrature modulated signal for transmission in an electronic device. Samples are obtained from a QAM signal at a predefined sampling rate to generate a signal spectrum. The samples are interpolated to move the signal spectrum on a frequency axis. Modulation is performed on the interpolated samples based on a digital carrier frequency to move the signal spectrum on the frequency axis. Digital to analog conversion and analog filtering are performed on the modulated samples in a real part of the signal spectrum to generate a quadrature modulated signal for transmission.

According to one embodiment, an electronic device is provided. The electronic device includes a processor and a non-transitory computer readable storage medium storing instructions that, when executed, cause the processor to obtain samples from a QAM signal at a predefined sampling rate to generate a signal spectrum, and interpolate the samples to move the signal spectrum on a frequency axis. The instructions also cause the processor to perform modulation on the interpolated samples based on a digital carrier frequency to move the signal spectrum on the frequency axis, and perform digital to analog conversion and analog filtering on the modulated samples in a real part of the signal spectrum to generate a quadrature modulated signal for transmission.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present disclosure focuses on the problem of placing a signal spectrum near a direct current (DC), i.e., zero frequency, with quadrature modulations. This placement ensures utilization of the transmission capacity of short connection cables. This is distinct from the conventional use of RF transmissions, where a carrier frequency is typically much higher than the bandwidth of a signal. According to embodiments of the present disclosure, the carrier frequency must be smaller than the bandwidth of a signal.

A change from 4-level PAM to 16-level PAM, i.e., a change from 2 bit to 4 bit transmission capacity, requires 12 decibels (dBs) more power. However, a change from 4-level PAM to 16-QAM, i.e., again, a change from 2 bit to 4 bit transmission capacity, requires 3 dBs more power. This power estimation is made around a symbol rate of 1E-6 or less, and without any coding. Accordingly, it is desirable to use quadrature modulated signaling.

Additionally, a short wire connection may support a several Giga bit transmission, but suffers severe signal attenuation at higher frequencies. Thus, OFDM signaling may be utilized instead of an equalizer. OFDM may have the potential to achieve a higher channel capacity by providing bit loading or equivalent power distribution to subcarriers. An alternative embodiment may utilize a single carrier system with an equalizer.

Figure 1:
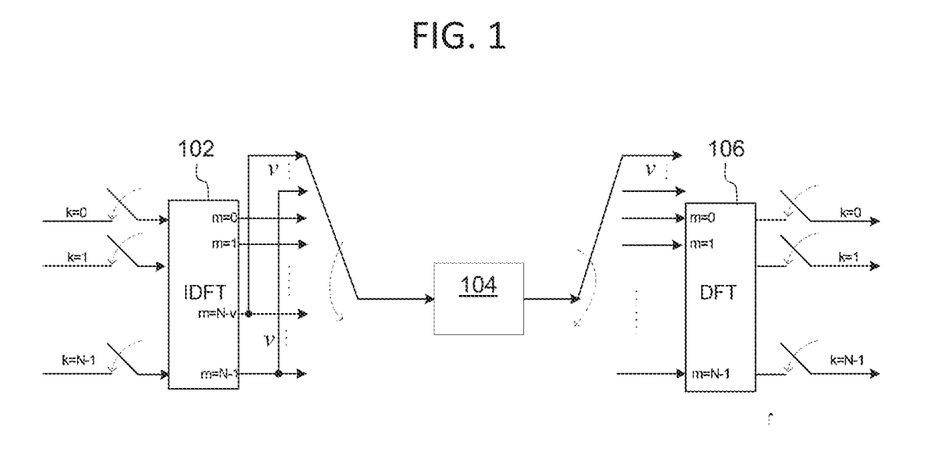
FIG. 1 is a diagram illustrating an implementation of orthogonal frequency division multiplexing (OFDM) based on a cyclic prefix (CP) and an inverse discrete Fourier transform (IDFT)-discrete Fourier transform (DFT) pair.

Referring initially, to FIG. 1, a diagram illustrates an implementation of OFDM based on a cyclic prefix (CP) and an IDFT-DFT pair.

In a transmitter 102 with CP, QAM symbols $k_0$ through $k_{N-1}$ undergo IDFT for CP v insertion, where N is the number of subcarriers. OFDM signal samples m are output from the transmitter 102 at a sample rate $$\frac{1}{\Delta t}.$$

The indexes of the OFDM signal samples range from m=0, 1, 2, ... N−1, N, ... N−1+v. The OFDM signal samples are fed through a discrete channel 104 to a receiver 106, where they undergo DFT to output QAM symbols $k_0$ through $k_{N-1}$ based on an OFDM symbol rate of 1/T.

The interdependencies between the sample rate $$\frac{1}{\Delta t},$$

subcarrier spacing F, OFDM symbol rate $$\frac{1}{T},$$

number of subcarrier N, and cyclic prefix v are shown in Table 1 below.

TABLE 1

| Sample rate $\left(\frac{1}{\Delta t}\right)$ | $\frac{1}{\Delta t}$ | $\frac{1}{\Delta t} = FN$ | $\frac{1}{\Delta t} = \frac{1}{T}(N+v)$ |
|---|---|---|---|
| Subcarrier spacing (F) | $F = \frac{\frac{1}{\Delta t}}{N}$ | F | $F = \frac{1}{T}\frac{(N+v)}{N}$ |
| ODFM symbol rate $\left(\frac{1}{T}\right)$ | $\frac{1}{T} = \frac{\frac{1}{\Delta t}}{N+v}$ | $\frac{1}{T} = F\frac{N}{(N+v)}$ | $\frac{1}{T}$ |

As shown in Table 1, sample rate, subcarrier spacing, and OFDM symbol rate are interdependent.

Figure 2:
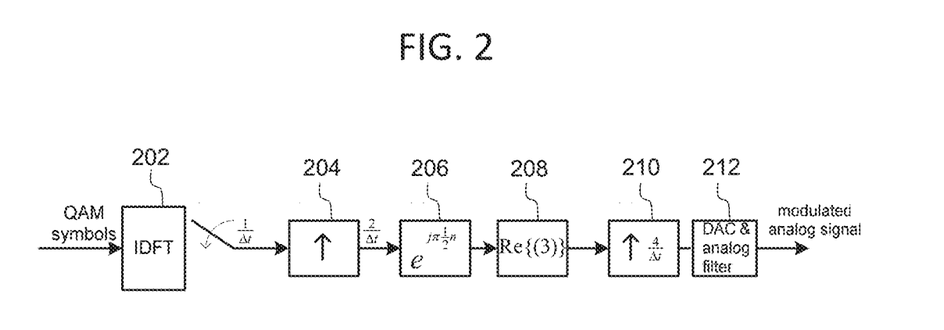
FIG. 2 is a diagram illustrating quadrature modulated analog signal generation using OFDM, according to an embodiment of the present disclosure.
Figure 3:
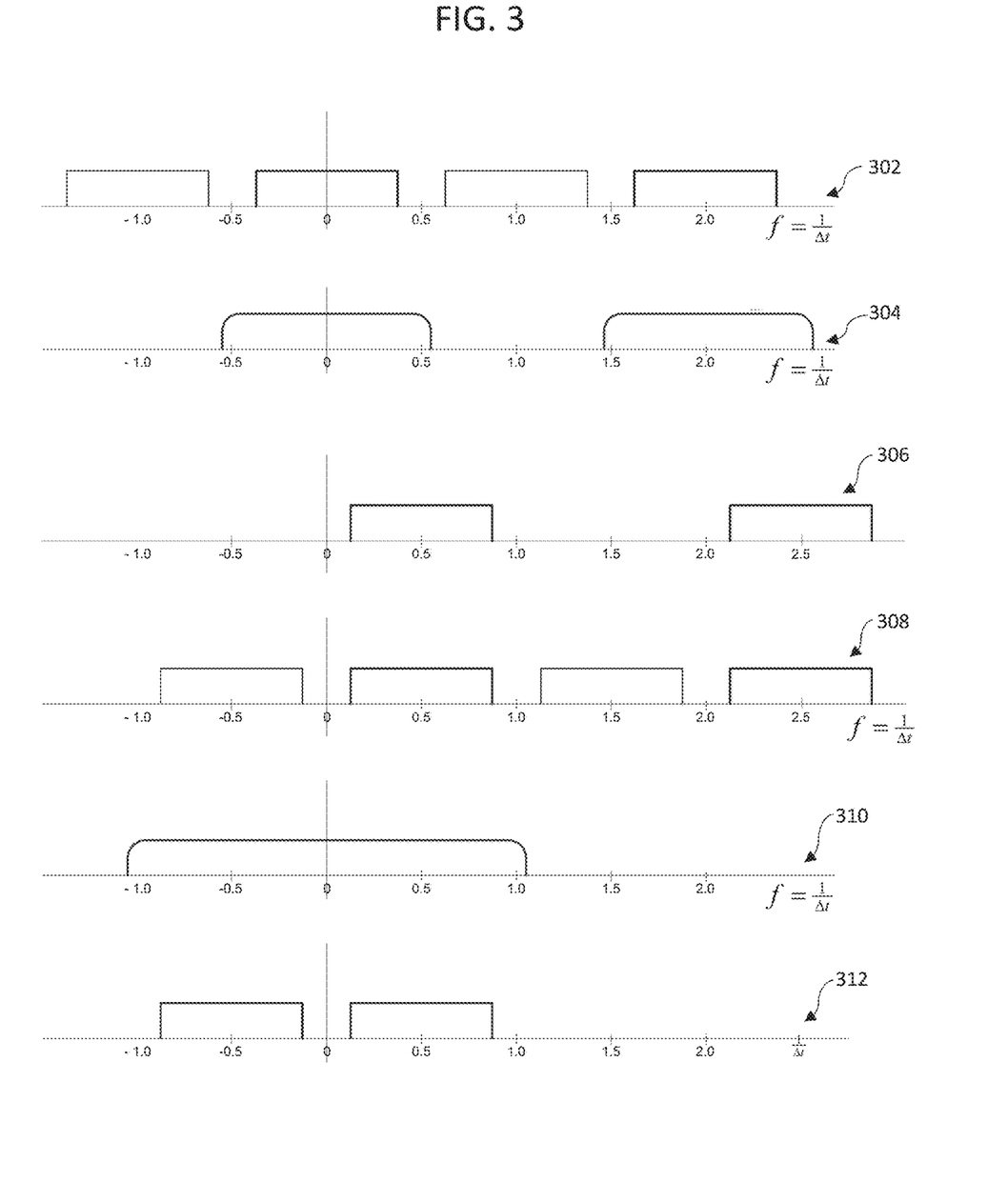
FIG. 3 is a diagram illustrating signal spectrums on a frequency axis in generating a modulated analog signal using OFDM, according to an embodiment of the present disclosure.

Referring now to FIG. 2, a diagram illustrates quadrature modulated analog signal generation using OFDM, according to an embodiment of the present disclosure. FIG. 3 is a diagram illustrating signal spectrums on a frequency axis in generating a modulated analog signal using OFDM, according to an embodiment of the present disclosure. A digital carrier frequency equal to half of a sampling rate, $$f_c = \frac{0.5}{\Delta t},$$

is utilized in this embodiment, but the present disclosure is not limited thereto.

At 202, QAM symbols are input to an IDFT module, and OFDM signal samples are obtained from IDFT outputs at a $$\frac{1}{\Delta t}$$

sampling rate. The OFDM signal samples are complex numbers. N subcarriers are partially filled, i.e., some subcarriers are empty at their edges for subsequent interpolation and analog filtering. A first signal spectrum 302 of the OFDM signal samples is illustrated in FIG. 3. Due to discrete samples, the first signal spectrum 302 is periodic with the sampling rate $$\frac{1}{\Delta t}.$$

At 204 of FIG. 2, an interpolator removes a periodic image at the sampling rate by interpolating the OFDM signal samples with an interpolation factor of 2 and 2/Δt sampling. This interpolation moves the first signal spectrum 302 to the right along the frequency axis by $$f_c = \frac{0.5}{\Delta t},$$

resulting in a second signal spectrum 304, as shown in FIG. 3.

At 206 of FIG. 2, a modulator performs modulation on the interpolated OFDM signal samples, i.e., using a complex exponential modulation of $$e^{j\pi\frac{1}{2}n}.$$

This modulation causes the second signal spectrum 304 to move to the right along the frequency axis by $$f_c = \frac{0.5}{\Delta t},$$

resulting in a third signal spectrum 306, as shown in FIG. 3. By appropriately choosing a digital carrier frequency and an interpolation factor, the modulation is accomplished without actual multiplication, since $$e^{j\pi\frac{1}{2}n} = \{1, 0, -1, j, -j\}.$$

At 208 of FIG. 2, a real part selection module selects only the real part of the modulated OFDM signal samples, resulting in a fourth signal spectrum 308 of FIG. 3. According to another embodiment of the present disclosure, 206 and 208 may be combined into a single step. There is no need for real multiplications since $\cos(\pi\frac{1}{2}n)=\{1, 0, -1, 0\}$ with n=0, 1, 2, 3, ..., and similarly $\sin(\pi\frac{1}{2}n)=\{0, 1, 0, -1\}$ with n=0, 1, 2, 3, ....

At 210, a digital interpolator interpolates the modulate OFDM signal samples with an interpolation factor of two and 4/Δt sampling. At 212, a digital-to-analog converter (DAC) and analog filter convert the modulated OFDM signal samples from digital modulated samples to analog values, and all the digital images are removed. A fifth signal spectrum 310 of FIG. 3 illustrates the result of the digital interpolation, and a sixth signal spectrum 312 of FIG. 3 illustrates the result after digital-to-analog conversion and analog filtering, resulting in a modulated analog signal.

In accordance with FIGS. 2 and 3, a signal spectrum is disposed near DC. However, this can be implemented in a number of ways.

Figure 4:
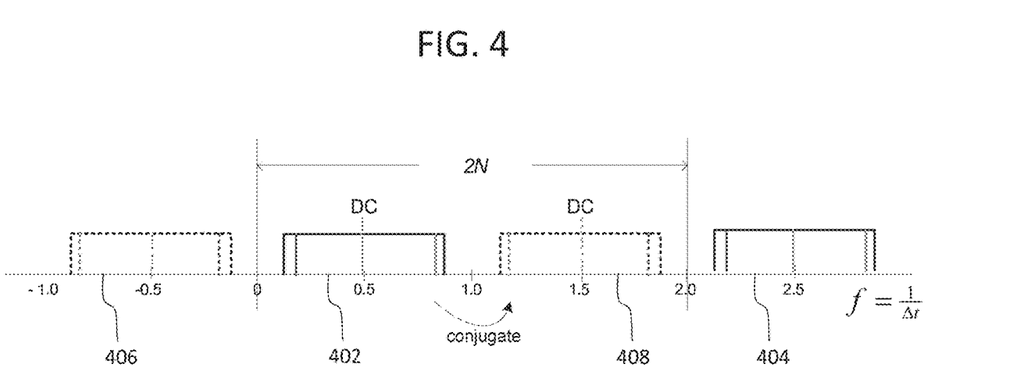
FIG. 4 is a diagram illustrating signal spectrums on a frequency axis in generating a modulated analog signal using OFDM and having 2N subcarriers, according to an embodiment of the present disclosure.

FIG. 4 is a diagram illustrating signal spectrums on a frequency axis in generating a modulated analog signal using OFDM and having 2N subcarriers, according to an embodiment of the present disclosure.

The size of IDFT in FIG. 2 is N subcarriers, and in FIG. 4, IDFT is expanded to 2N subcarriers. QAM symbols, as the input of IDFT, are directly placed at the digital carrier frequency locations, as shown as a first signal spectrum 402 and a second signal spectrum 404. Simultaneously, their conjugates are placed at "negative" digital carrier frequency locations, as shown as a third signal spectrum 406 and a fourth signal spectrum 408. Accordingly, the output of IDFT is real and not complex, due to the conjugate symmetry imposed at the input.

Note that each of interpolation (204 of FIG. 2), complex exponential multiplication (206 of FIG. 2), and real part selection (208 of FIG. 2) are implemented, as shown in FIG. 4, by the direct placement of QAM symbols and their conjugates, at the digital carrier frequency locations and the corresponding "negative" digital carrier frequency locations, respectively.

In accordance with embodiments of the present disclosure, all N subcarriers may be used for bandwidth efficiency. However, a number of used subcarriers, Ku, are constrained by two requirements, specifically, filtering to remove all digital images and the shape of the subcarrier spectrum. The removal of the digital images is achieved by using an interpolation filter, digital-to-analog conversion, and an analog filter. A typical OFDM with a cyclic prefix, which is adopted by most standards using OFDM, uses a rectangular pulse, and thus, its spectrum is in the shape of $$\frac{\sin(\pi f T)}{\pi f T}$$

with T being OFDM symbol time.

The interpolation factor can be large to ease analog filtering, however, the higher the interpolation the more complex. Accordingly, as described in the previous embodiment, an interpolation factor of two was used before modulation, and an additional digital interpolation was performed before digital-to-analog conversion and analog filtering. However, embodiments of the present invention are not limited thereto, and the interpolation factor may be adapted for each case of design and application.

Alternative embodiments of the present disclosure may select a digital carrier frequency other than $$f_c = \frac{0.5}{\Delta t}.$$

For example, a digital carrier frequency of $$f_c = \frac{0.25}{\Delta t}$$

selected, a described in detail below.

Figure 5:
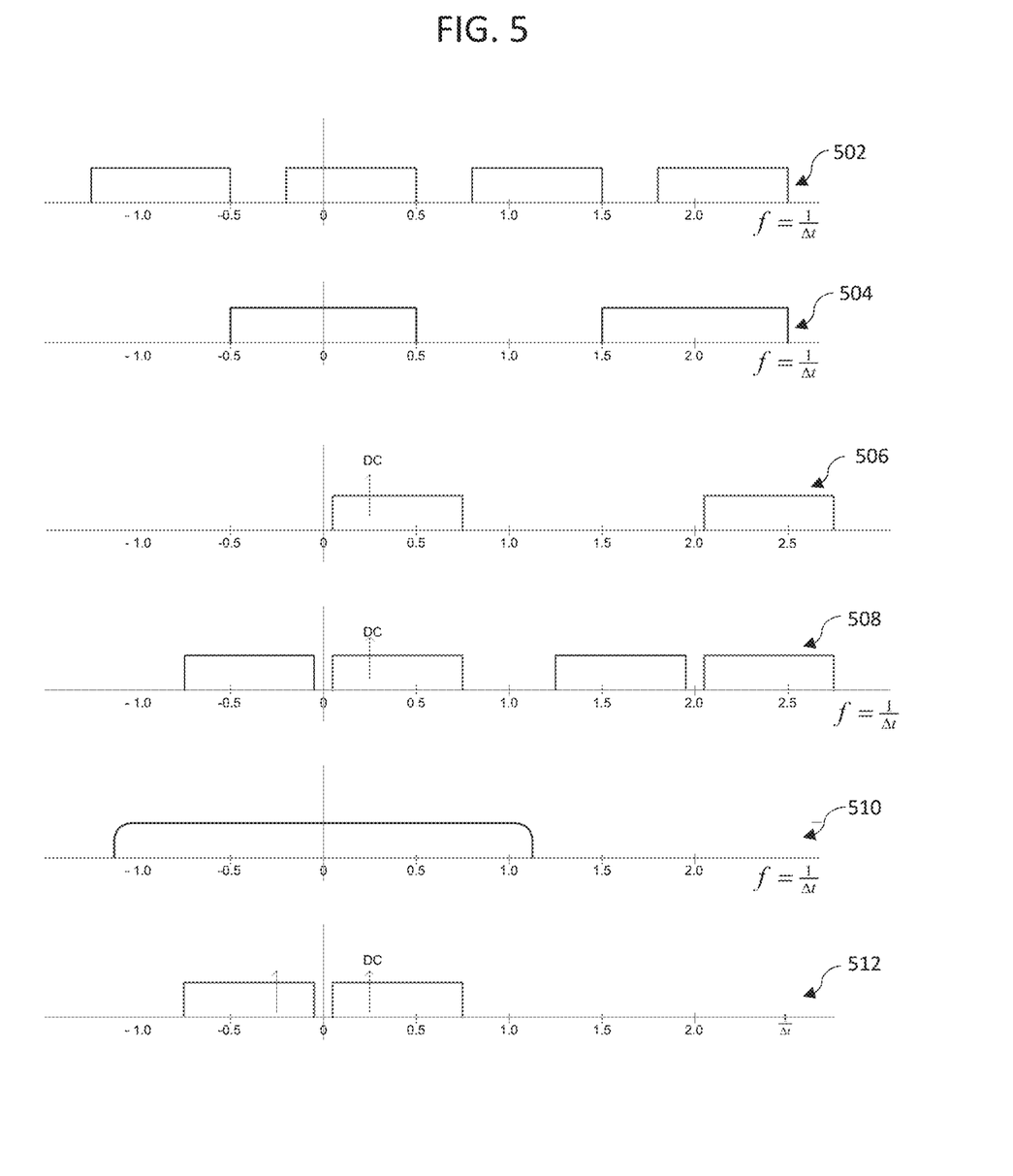
FIG. 5 is a diagram illustrating signal spectrums on a frequency axis in generating a modulated analog signal using OFDM, according to another embodiment of the present disclosure.

FIG. 5 is a diagram illustrating signal spectrums on a frequency axis in generating a modulated analog signal using OFDM, according to another embodiment of the present disclosure. Specifically, signal generation is implemented using the expanded 2N subcarriers IDFT of FIG. 4 by properly adjusting the placement of the digital carrier frequency and other subcarriers and their conjugate locations. Accordingly, the expanded IDFT may utilize a different set of digital carrier frequency $f_c$, number of used subcarriers $K_u$, and interpolation factor. The IDFT expansion factor is the same as the interpolation factor.

QAM symbols are input to an IDFT module, and OFDM signal samples are obtained from IDFT outputs at a $$\frac{1}{\Delta t}$$

sampling rate. A first signal spectrum 502 of the OFDM signal samples is illustrated in FIG. 5.

A periodic image is removed by interpolating the OFDM signal samples with an interpolation factor of 2 and 2/Δt sampling. This interpolation moves the first signal spectrum 502 to the right along the frequency axis by $$f_c = \frac{0.25}{\Delta t},$$

resulting in a second signal spectrum 504.

Modulation is performed on the interpolated OFDM signal samples, i.e., using a complex exponential modulation of $e^{j\pi 1/4n}$. This modulation causes the second signal spectrum 504 to move to the right along the frequency axis by $$f_c = \frac{0.25}{\Delta t},$$

resulting in a third signal spectrum 506.

Only the real part of the modulated OFDM signal samples is selected, resulting in a fourth signal spectrum 508.

The modulated OFDM signal samples are converted from digital modulated samples to analog values, and all the digital images are removed. A fifth signal spectrum 510 illustrates the result of the digital interpolation, and a sixth signal spectrum 512 illustrates the result after DAC and analog filtering, resulting in a modulated analog signal.

As described above, a typical OFDM with a cyclic prefix uses a rectangular pulse, and thus, its spectrum is in the shape of $$\frac{\sin(x)}{x}$$

where x=πfT, and T being OFDM symbol time. In order to reduce the out of band spectrum, a large number of subcarriers, N, say thousands, are used in the standards. When performing windowing, a rectangular pulse is modified to a trapezoidal transmit pulse or a smoother end-to-end pulse so that the spectrum decays much faster.

Figure 6:
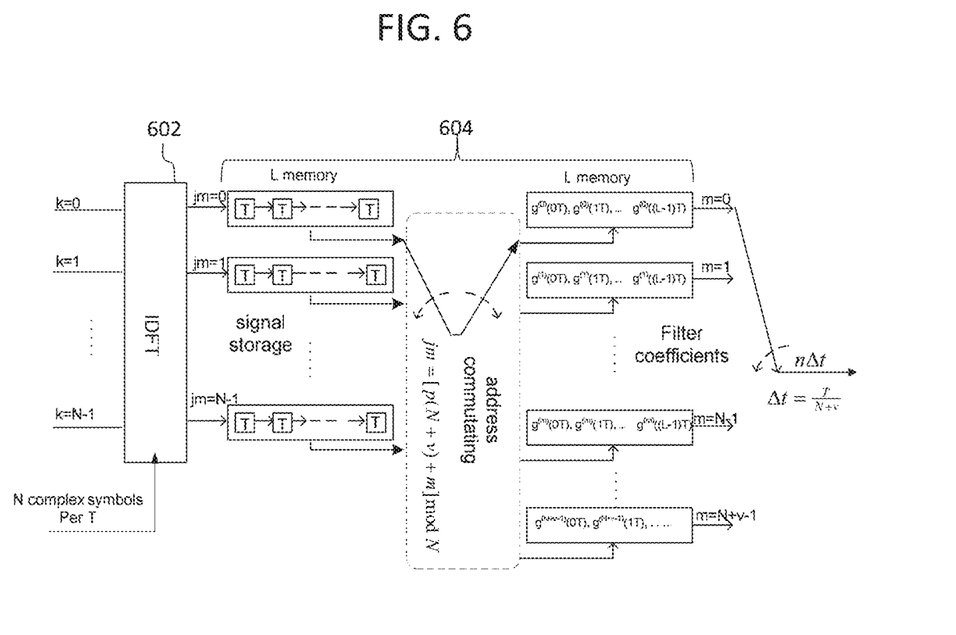
FIG. 6 is a diagram illustrating a windowing method using a commutating filter, according to an embodiment of the present disclosure.

FIG. 6 is a diagram illustrating a method using a commutating filter, according to an embodiment of the present disclosure. The commutating filter is a 2-tap filter (L=1 memory). This implementation differs from that suggested for Wi-Fi implementation.

The pulse shape of a subcarrier, i.e., its spectrum, may have a bandwidth that is limited to that of the subcarrier, similar to a single carrier system, and a large variety of pulses can be used. IDFT and a polyphase structure (i.e., sharing one filter for all subcarriers), referred to as a commutating filter, are utilized in this embodiment. However, any pulse shaping filter, having a bandwidth that is limited to that of the subcarrier may be used.

As shown in FIG. 6, QAM symbols $k_0$ through $k_{N-1}$ are provided to an IDFT module 602 along with N complex symbols per T, where N is the number of subcarriers. QAM symbols k are converted to time samples $jm_0$ through $jm_{N-1}$ and are provided to a polyphase digital finite impulse response (FIR) filter, referred to as a commutating filter 604, to generate OFDM signal samples $m_0$ through $m_{N+v-l}$ with the sample rate $$\frac{1}{\Delta t}.$$

The commutating filter 604 relies upon signal storage, address commutating of $j_m=[p(N+v)+m]\mod N$, and filter coefficients $g^{(m)}(0\ T)\ g^{(m)}(1\ T), \ldots g^{(m)}((L-1)T)$ to produce the OFDM signal samples $m_0$ through $m_{N+v-l}$.

Figure 7:
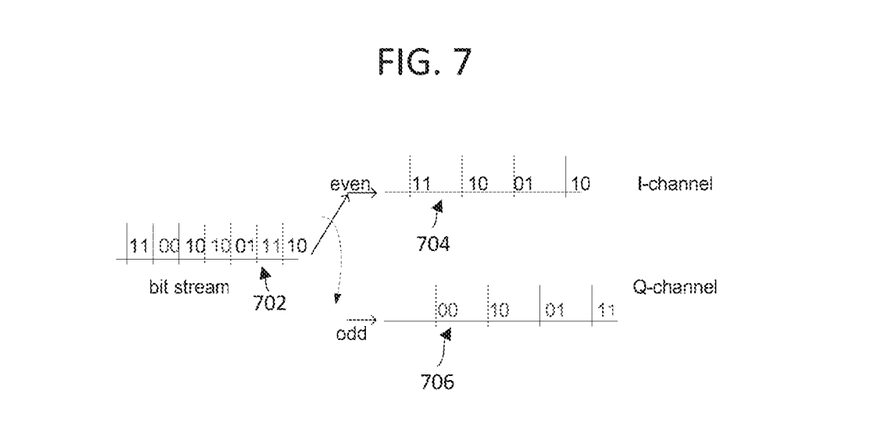
FIG. 7 is a diagram illustrating the dividing of a bit stream by staggering.

FIG. 7 is a diagram illustrating the dividing of a bit stream by staggering. A staggered QAM may be used for bandwidth efficiency and ease of filter design. In staggering, rather than converting a complex symbol from bit to symbol mapping, a bit stream 702 is divided into even bits 704 and odd bits 706, and thus, real parts (I-channel) and imaginary parts (Q-channel) are transmitted with a half symbol time difference.

Figure 8:
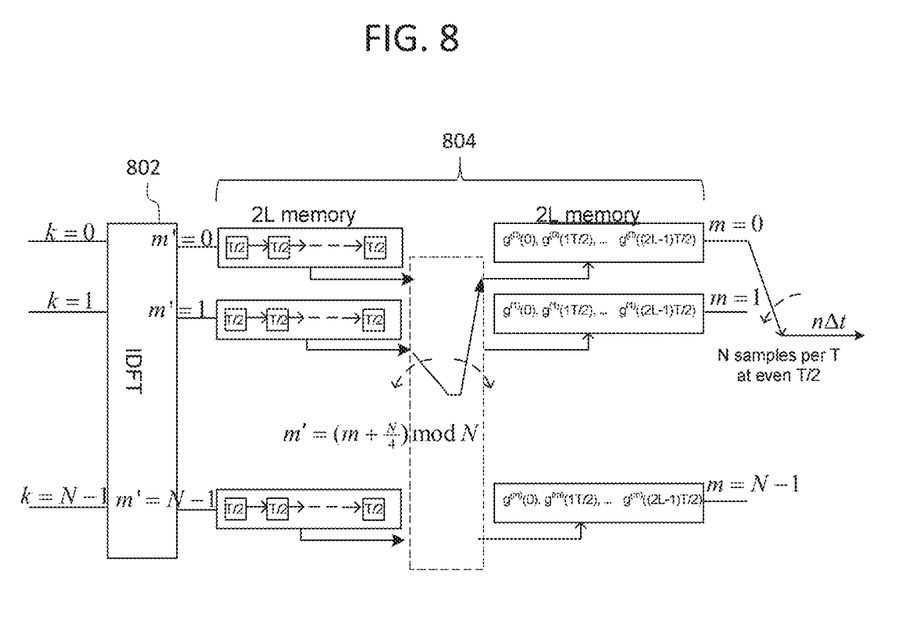
FIG. 8 is a diagram illustrating an implementation of a digital representation of OFDM with staggered QAM, according to an embodiment of the present disclosure.

FIG. 8 is a diagram illustrating an implementation of a digital representation of OFDM with staggered QAM, according to an embodiment of the present disclosure. When the idea of staggering real and imaginary in time is applied to OFDM, this form of OFDM is obtained. This digital implementation uses IDFT followed by a commutating filter. Additionally, while this digital implementation may appear different from an analog counterpart, a one-to-one correspondence exists. Specifically, the same function is implemented digitally and is computationally efficient.

The commutating filter is a 2-tap filter (2 L memory). As shown in FIG. 8, QAM symbols $k_0$ through $k_{N-1}$ are provided to an IDFT module 802, where N is the number of subcarriers. QAM symbols k are converted to time samples $m'_0$ through $m'_{N-1}$ and are provided to a polyphase digital finite impulse response (FIR) filter, referred to as a commutating filter 804, to generate OFDM signal samples $m_0$ through $M_{N-1}$. The commutating filter 804 relies upon signal storage, address commutating of $m'=(m+N/4)\mod N$, and filter coefficients $g^{(m)}(0)g^{(m)}(1\ T/2), \ldots g^{(m)}((2\ L-1)T/2)$ to produce the OFDM signal samples $m_0$ through $M_{N+v-l}$.

The result is that the filter can overlap with neighboring subcarriers, still maintain orthogonality, and thus, produces the most bandwidth efficient OFDM. There is no need for the gap between OFDM symbols, i.e., there is no CP.

Figure 9:
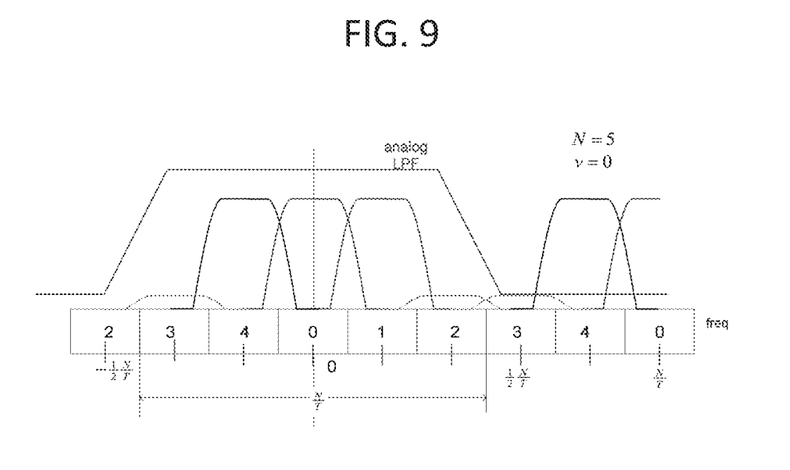
FIG. 9 is a diagram illustrating a staggered QAM based OFDM and signal spectrum, according to an embodiment of the present disclosure.

FIG. 9 is a diagram illustrating a staggered QAM based OFDM signal spectrum, according to an embodiment of the present disclosure. The filter design is more flexible since it can overlap with adjacent subcarriers. The excess bandwidth of the filter is 0.4 and it is square root raised cosine shape. The bandwidth of a filter can be twice of subcarrier bandwidth.

Figure 10:
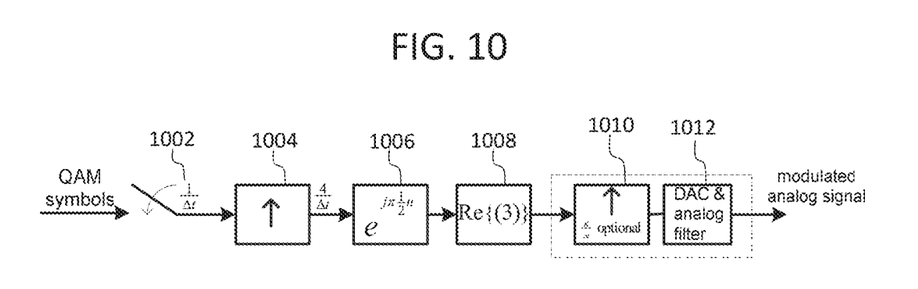
FIG. 10 is a diagram illustrating modulated analog signal generation using a single carrier modulations, according to an embodiment of the present disclosure.

Referring now to FIG. 10, a diagram illustrates modulated analog signal generation using a single carrier modulations, according to an embodiment of the present disclosure. A single carrier baseband QAM signal may have a bandwidth $$\frac{1+\beta}{T},$$

where $0\leq\beta\leq 1$ and is referred to as an excess bandwidth, and where a symbol rate is $$\frac{1}{T}.$$

The minimum bandwidth is the same as the symbol rate.

At 1002, QAM symbols are input and signal samples are obtained at a $$\frac{1}{\Delta t}$$

sampling rate.

At 1004, an interpolator removes a periodic image at the sampling rate by interpolating the signal samples with an interpolation factor of 4 and $4/\Delta t$ sampling.

At 1006, a modulation module performs modulation on the interpolated signal samples, i.e., using a complex exponential modulation of $$e^{j\pi\frac{1}{2}n}.$$

At 1008, a real part selection module selects only the real part of the modulated signal samples.

At 1010, a digital interpolator interpolates the modulated signal samples with an interpolation factor of two and $K/\Delta t$ sampling. At 1012, a DAC and analog filter convert the modulated signal samples from digital modulated samples to analog values, thereby removing all digital images, and resulting in a modulated analog signal.

Typically the digital carrier frequency may be chosen as $$\frac{1}{T}$$

for the range of $0\leq\beta\leq 1$ and the interpolation factor 4. This choice makes the digital modulation, i.e., 1006 and 1004 of FIG. 10, multiplication free since $$e^{j2\pi\frac{1}{\Delta t}\frac{\Delta t}{4}} = e^{j\pi\frac{1}{2}n}$$

has the value or $\{1, 0, -1, 0\}$ or $\{0, j, 0, -j\}$. However, the digital carrier frequency can be chosen as $$\frac{1}{2}\frac{1+\beta}{T}$$

depending on $\beta$ while the interpolation factor may be maintained as 4.

Figure 11:
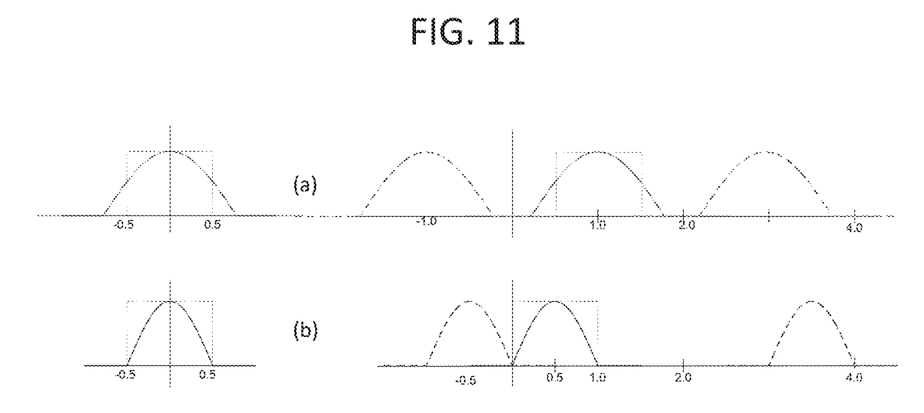
FIG. 11 is a diagram illustrating a single carrier signal spectrum with digital carrier modulation and different excess bandwidths, according to an embodiment of the present disclosure.

FIG. 11 is a diagram illustrating a single carrier signal spectrum with digital carrier modulation and different excess bandwidths, according to an embodiment of the present disclosure. In (a) of FIG. 11, a system is provided that has an excess bandwidth of 1.0 and a digital carrier frequency equal to the symbol rate $$\frac{1}{T}.$$

In (b) of FIG. 11, a system is provided that has an excess bandwidth of 0 and a digital carrier frequency equal to half of the symbol rate $$\frac{0.5}{T}.$$

Thus, depending on the excess bandwidth β, the digital carrier frequency can be chosen from half of the symbol rate $$\left(\frac{1}{T}\right),$$

to the symbol rate $$\left(\frac{0.5}{T}\right).$$

when the interpolation factor is 4. The excess bandwidth of zero is practically possible by 1+D partial response signaling, where its spectrum is zero when |fT|>0.5 and is cos (πfT) when |fT|≤0.5.

Figure 12:
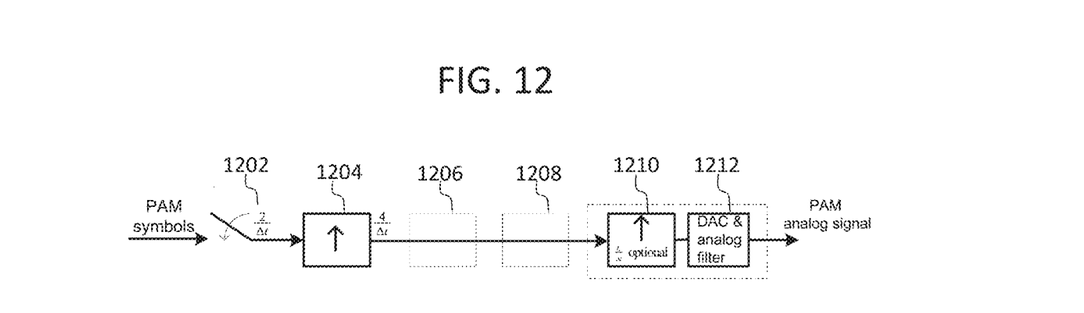
FIG. 12 is a diagram illustrating analog signal generation using PAM, according to an embodiment of the present disclosure.

FIG. 12 is a diagram illustrating analog signal generation using PAM, according to an embodiment of the present disclosure. PAM signals can be used with a doubling of the symbol rate.

At 1202, PAM symbols are input and signal samples are obtained at a 2/ΔT sampling rate.

At 1204, an interpolator removes a periodic image at the sampling rate by interpolating the signal samples with an interpolation factor of 4 and 4/Δt sampling.

At 1210, a digital interpolator interpolates the signal samples with an interpolation factor of two and K/Δt sampling. At 1212, a DAC and an analog filter converts the interpolated signal samples from digital modulated samples to analog values, and the digital images are removed.

PAM signaling with twice the symbol rate is considered a zero digital carrier frequency. Thus, modulation at 1206 and real selection at 1208 are transparent. Furthermore, there is no need for carrier phase recovery at the receiver. However, single carrier systems, in general, require an equalizer at the receiver, a pre-distortion equalizer at the transmitter, or both, in order to compensate for the frequency dependent loss of a cable.

Figure 13:
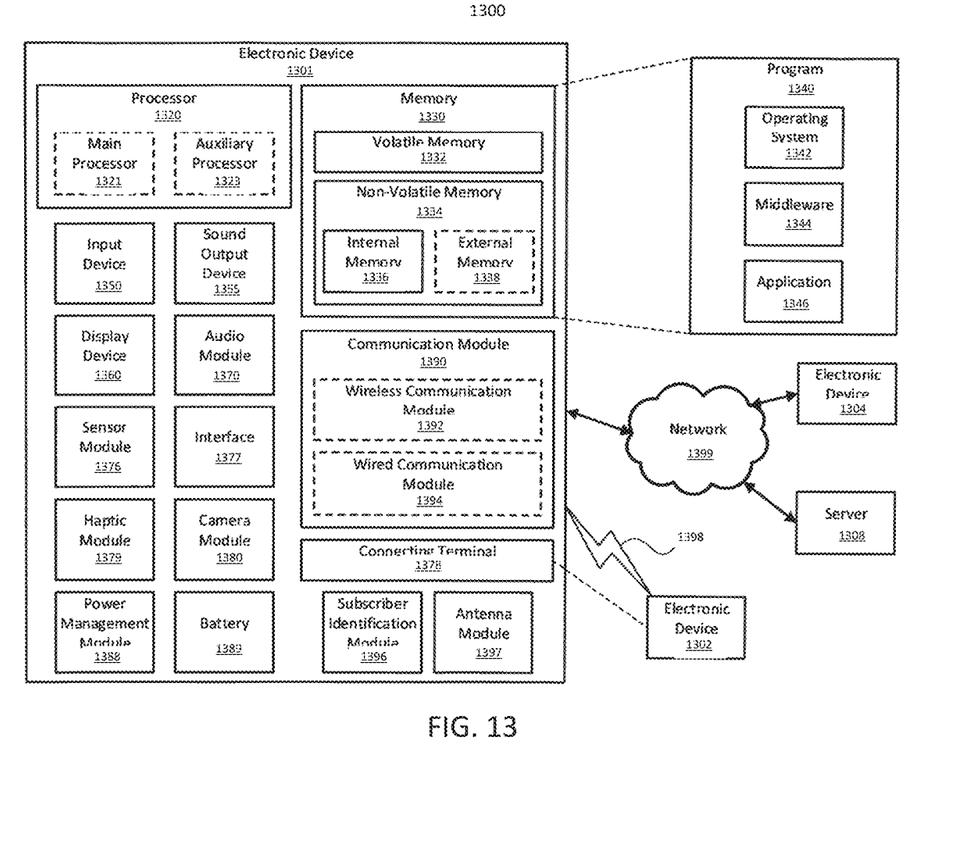
FIG. 13 is a block diagram of an electronic device in a network environment, according to one embodiment.

FIG. 13 is a block diagram of an electronic device in a network environment, according to one embodiment. Referring to FIG. 13, an electronic device 1301 in a network environment 1300 may communicate with an electronic device 1302 via a first network 1398 (e.g., a short-range wireless communication network), or an electronic device 1304 or a server 1308 via a second network 1399 (e.g., a long-range wireless communication network). The electronic device 1301 may communicate with the electronic device 1304 via the server 1308. The electronic device 1301 may include a processor 1320, a memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In one embodiment, at least one (e.g., the display device 1360 or the camera module 1380) of the components may be omitted from the electronic device 1301, or one or more other components may be added to the electronic device 1301. Some of the components may be implemented as a single integrated circuit (IC). For example, the sensor module 1376 (e.g., a fingerprint sensor, an iris sensor, or an illuminance sensor) may be embedded in the display device 1360 (e.g., a display).

The processor 1320 may execute, for example, software (e.g., a program 1340) to control at least one other component (e.g., a hardware or a software component) of the electronic device 1301 coupled with the processor 1320, and may perform various data processing or computations. As at least part of the data processing or computations, the processor 1320 may load a command or data received from another component (e.g., the sensor module 1376 or the communication module 1390) in volatile memory 1332, process the command or the data stored in the volatile memory 1332, and store resulting data in non-volatile memory 1334. The processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or execute a particular function. The auxiliary processor 1323 may be implemented as being separate from, or a part of, the main processor 1321.

The auxiliary processor 1323 may control at least some of the functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). The auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by another component (e.g., the processor 1320) of the electronic device 1301, from the outside (e.g., a user) of the electronic device 1301. The input device 1350 may include, for example, a microphone, a mouse, or a keyboard.

The sound output device 1355 may output sound signals to the outside of the electronic device 1301. The sound output device 1355 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. The display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. The audio module 1370 may obtain the sound via the input device 1350, or output the sound via the sound output device 1355 or a headphone of an external electronic device 1302 directly (e.g., wired) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. The sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device 1302 directly (e.g., wired) or wirelessly. The interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device 1302. The connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or an electrical stimulus which may be recognized by a user via tactile sensation or kinesthetic sensation. The haptic module 1379 may include, for example, a motor, a piezoelectric element, or an electrical stimulator.

The camera module 1380 may capture a still image or moving images. The camera module 1380 may include one or more lenses, image sensors, image signal processors, or flashes.

The power management module 1388 may manage power supplied to the electronic device 1301. The power management module 1388 may be implemented as at least part of, for example, a power management integrated circuit (PMIC).

The battery 1389 may supply power to at least one component of the electronic device 1301. The battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the AP) and supports a direct (e.g., wired) communication or a wireless communication. The communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or a standard of the Infrared Data Association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. The antenna module 1397 may include one or more antennas, and, therefrom, at least one antenna appropriate for a communication scheme used in the communication network, such as the first network 1398 or the second network 1399, may be selected, for example, by the communication module 1390 (e.g., the wireless communication module 1392). The signal or the power may then be transmitted or received between the communication module 1390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. All or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

One embodiment may be implemented as software (e.g., the program 1340) including one or more instructions that are stored in a storage medium (e.g., internal memory 1336 or external memory 1338) that is readable by a machine (e.g., the electronic device 1301). For example, a processor of the electronic device 1301 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of generating a quadrature modulated signal for transmission in an electronic device, the method comprising:
   obtaining samples from a quadrature amplitude modulation (QAM) signal at a predefined sampling rate to generate a signal spectrum;
   interpolating the samples to move the signal spectrum on a frequency axis;
   performing modulation on the interpolated samples based on a digital carrier frequency to move the signal spectrum on the frequency axis;
   selecting modulated samples that are in a real part of the signal spectrum, wherein the signal spectrum comprises the real part and an imaginary part; and
   performing digital to analog conversion and analog filtering on the selected samples in the real part of the signal spectrum, and not the imaginary part of the signal spectrum, to generate a quadrature modulated signal for transmission.

2. The method of claim 1, wherein interpolating the samples moves the signal spectrum right on the frequency axis by the digital carrier frequency.

3. The method of claim 1, wherein performing modulation moves the signal spectrum right on the frequency axis by the digital carrier frequency, and the modulation is a complex exponential modulation.

4. The method of claim 1, wherein obtaining the samples comprises:
   obtaining orthogonal frequency division multiplexing (OFDM) signal samples from inverse discrete Fourier transform (IDFT) output of the QAM signal.

5. The method of claim 4, wherein obtaining the OFDM signal samples comprises:
   converting QAM symbols into time samples; and
   generating the OFDM signal samples by passing the time samples through a polyphaser digital finite impulse response (FIR) filter, wherein a bandwidth of the FIR filter is equal to that of a subcarrier.

6. The method of claim 4, wherein the QAM signal is a staggered QAM signal and obtaining the OFDM signal samples comprises generating the OFDM signal samples using a frequency domain filter having a bandwidth twice that of a subcarrier with no cyclic prefix loss.

7. The method of claim 4, wherein a size of IDFT is equal to one of a number of subcarriers and twice the number of subcarriers.

8. The method of claim 4, wherein the OFDM signal samples are interpolated with an interpolation factor of 2 and twice the sampling rate to remove a periodic image from the signal spectrum.

9. The method of claim 4, wherein performing digital to analog conversion and analog filtering comprises:
   performing digital interpolation with an interpolation factor of 2 and four times the sampling rate.

10. The method of claim 1, wherein the QAM signal is a single carrier baseband QAM signal.

11. The method of claim 10, wherein the samples are interpolated with an interpolation factor of 4 and four times the sampling rate to remove a periodic image from the signal spectrum.

12. An electronic device, comprising:
    a processor; and
    a non-transitory computer readable storage medium storing instructions that, when executed, cause the processor to:

obtain samples from a quadrature amplitude modulation (QAM) signal at a predefined sampling rate to generate a signal spectrum;

interpolate the samples to move the signal spectrum on a frequency axis;

perform modulation on the interpolated samples based on a digital carrier frequency to move the signal spectrum on the frequency axis;

select modulated samples that are in a real part of the signal spectrum, wherein the signal spectrum comprises the real part and an imaginary part and perform digital to analog conversion and analog filtering on the selected samples in the real part of the signal spectrum, and not the imaginary part of the signal spectrum, to generate a quadrature modulated signal for transmission.

13. The electronic device of claim 12, wherein, when obtaining the samples, the instructions further cause the processor to:

obtain orthogonal frequency division multiplexing (OFDM) signal samples from inverse discrete Fourier transform (IDFT) output of the QAM signal.

14. The electronic device of claim 13, wherein, when obtaining the OFDM signal samples, the instructions further cause the processor to:

convert QAM symbols into time samples; and generate the OFDM signal samples by passing the time samples through a polyphaser digital finite impulse response (FIR) filter, wherein a bandwidth of the FIR filter is equal to that of a subcarrier.

15. The electronic device of claim 13, wherein the QAM signal is a staggered QAM signal and obtaining the OFDM signal samples comprises generating the OFDM signal samples using a frequency domain filter having a bandwidth twice that of a subcarrier with no cyclic prefix loss.

16. The electronic device of claim 13, wherein a size of IDFT is equal to one of a number of subcarriers and twice the number of subcarriers.

17. The electronic device of claim 13, wherein the OFDM signal samples are interpolated with an interpolation factor of 2 and twice the sampling rate to remove a periodic image from the signal spectrum.

18. The electronic device of claim 13, wherein, when performing digital to analog conversion and analog filtering, the instructions further cause the processor to:

perform digital interpolation with an interpolation factor of 2 and four times the sampling rate.

19. The electronic device of claim 12, wherein the QAM signal is a single carrier baseband QAM signal.

20. The electronic device of claim 12, wherein the samples are interpolated with an interpolation factor of 4 and four times the sampling rate to remove a periodic image from the signal spectrum.

* * * * *